S. F. BASHARA.
MEANS FOR LOCKING VALVES.
APPLICATION FILED AUG. 21, 1920.
1,421,059. Patented June 27, 1922.
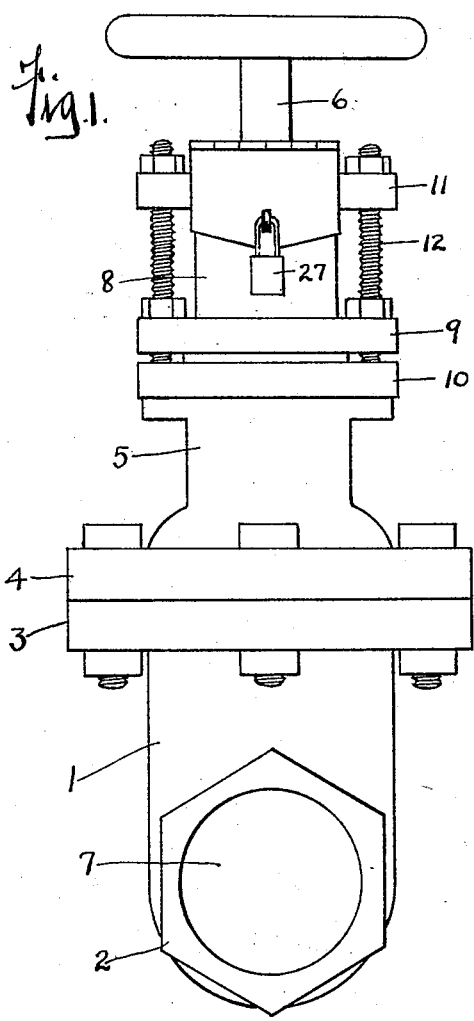
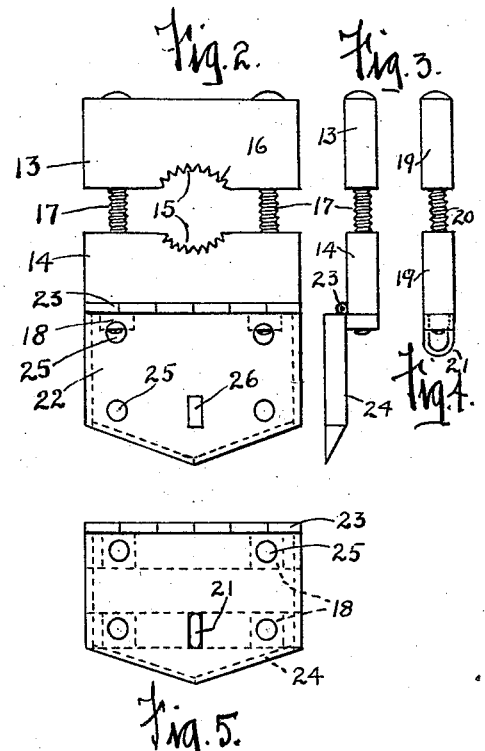
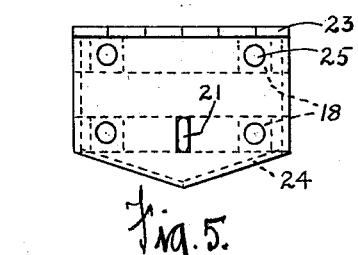
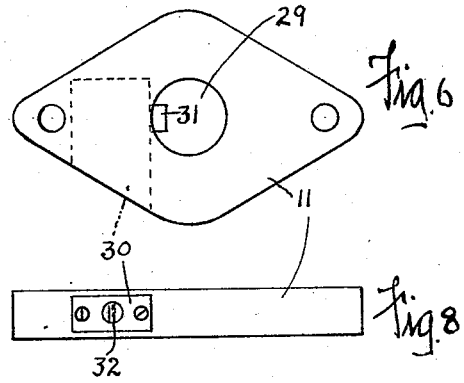
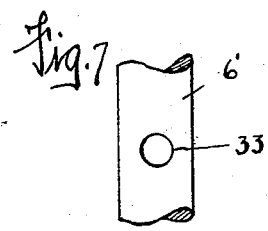
SAMUEL F. BASHARA, INVENTOR.
Jesse R. Stone ATTORNEY.

UNITED STATES PATENT OFFICE.

SAMUEL F. BASHARA, OF HOUSTON, TEXAS.

MEANS FOR LOCKING VALVES.

1,421,059.  Specification of Letters Patent.  Patented June 27, 1922.

Application filed August 21, 1920. Serial No. 405,016.

*To all whom it may concern:*

Be it known that I, SAMUEL F. BASHARA, a citizen of the United States, residing at Houston, Harris County, Texas, have invented a certain new and useful Improvement in Means for Locking Valves, of which the following is a full, clear, and exact description, such as will enable others skilled in the art to which it appertains to make and use the same.

My invention relates to an improvement in means for locking valves and has special application to valves for use in pipes.

It is desirable in many instances to so secure the hand-operated valves, used in pipes for conducting water, oil, etc., that they may not be loosened until such action is necessary. It sometimes occurs that hydrants are opened, or valves in pipe lines are often opened or closed, when such action is not desired, by unauthorized parties. To avoid such manipulation of these hand-operated valves, my invention has been developed.

An object of my invention is, therefore, to provide a locking means for hand-operated valves which will prevent their movement when so secured.

Another object is to provide a locking means which will effectually prevent rotation of the valve stem and which may not be operated except by the unlocking of the securing means. Other objects and advantages will be apparent from the specification which follows.

Referring to the drawing illustrating several embodiments of my invention, Fig. 1 is a side elevation of a common type of hand-valve used on pipe lines, showing my locking means applied thereto; Fig. 2 is a top plan view of the locking means; Fig. 3 is a side elevation of the locking means shown in Fig. 2; Fig. 4 is a similar view of the lower member used with my invention;
Fig. 5 is a front view of the hasp connected with my locking means; Fig. 6 is a top plan view of the yoke used with the hand valve disclosed in Fig. 1 and illustrates a different embodiment of locking means; Fig. 7 is a broken section of the valve stem to be used with the embodiment disclosed in Fig. 6; and Fig. 8 is an edge view of the yoke shown in Fig. 6.

In Fig. 1 I have shown an ordinary type of hand-operated gate valve commonly used in pipe lines. This valve has a lower valve chamber 1, having an attaching T 2 at the lower end thereof, by means of which the said valve is connected to a pipe line. This lower valve chamber is connected by lateral flanges 3, bolted to similar flanges 4 on an upper member 5 of the valve chamber. The valve stem 6 projects downwardly through the valve chamber, into which it is threaded, and has a gate valve 7 on the lower end thereof, closing the passage through the T. The upper part of the valve chamber has a stuffing box 8 thereon, which has a lower yoke 9 bolted adjustably to the upper flange 10 of the valve chamber. The upper end of the stuffing box 8 has a yoke 11, which is secured by threaded bolts 12 to the upper flange of the valve chamber. The details of this construction are not a part of my invention and are here shown more or less diagrammatically.

In securing the valve stem 6 against rotation, I contemplate securing about the said valve stem two opposite jaw members 13 and 14, these jaws having semi-circular recesses 15 on the adjacent faces thereof, said recesses being provided with teeth 16, as shown particularly in Fig. 2. These jaws are adapted to be secured in adjustable relation to each other by threaded bolts 17, passing through the adjacent ends of the two jaw members. These jaws are adjustable, as stated, by means of nuts 18 on the ends of bolts 17, by means of which the jaws may be forced toward each other, in an obvious manner, so as to clamp the same firmly about the valve stem 6. To secure these jaws against removal after they have been tightened firmly against the valve stem, I provide a second clamping member consisting of two opposite plates 19, adapted to fit about the upper end of the stuffing box 8 below the yoke 11. These two plates are secured together by means of threaded bolts 20, similar to the bolts 17 previously described. One of the clamping plates 19 has a central U-shaped staple 21 projecting centrally therefrom to accommodate a lock, which will be presently described. The staple 21 may be made integral with the clamping plate if desired and it is obvious that it can be formed on the valve structure in any manner desired without departing from the spirit of my invention.

The jaw 14 has, on its outer edge, a depending hasp 22, hinged thereto at 23. As will be noted from Fig. 3, this hasp is somewhat cover shaped adapting it to fit over the ends of the nuts 18, which lock the clamping jaws together. It has inwardly projecting lateral flanges 24, which also serve, when the hasp is down, to prevent tampering with the locking nuts 18. The hasp is provided with openings 25 positioned in such manner as to receive the ends of the bolts 17 and 20 of the locking means, but, as will be apparent, it will not be possible to rotate the nuts 18 through these openings. The lower edge of the hasp has an opening 26 therein, which will register with the staple 21 on the lower clamping plate 19, so that a padlock 27 may be introduced through the projecting staple to prevent the opening of the hasp.

When the clamping jaws 13 and 14 have been secured firmly about the valve stem 6, and the clamping plates 19 have been clamped below the yoke 11, the hasp 22 may be swung downwardly so that the staple 21 will project through the opening 26, after which the device may be locked by means of a padlock. The inwardly projecting flange 24 on the hasp will securely cover the locking nuts 18 of the clamping jaws and thus prevent the rotation of the valve stem 6 until the device is again unlocked and the jaws released. This locking means will obviously lock the valve in any position, either open or closed, so that the valve may be adjusted to any desired position and then locked.

In Figs. 6 and 8 I have shown a locking means which may be formed as a part of the upper yoke 11 of the stuffing box. In this modification I contemplate recessing the yoke at one side of the opening 29, through which the valve stem 6' projects. Within this recess I contemplate inserting a lock 30 of any ordinary construction, having a laterally projecting latch 31 therein, said latch being operated by means of a key, which may be inserted within the key hole 32 in the usual manner. The latch 31 of my lock is adapted to project laterally into the opening 29. To co-operate with the latch in this modification, I contemplate recessing the side of the valve stem 6' at 33 in such manner that the latch 31 may be received therein.

In the operation of this modification it will be apparent that when the valve stem is secured at its proper point, the recess 33 will be so positioned as to register with the latching member 31. The turning of the key within the lock will therefore throw the latch 31 within the recess 33 and prevent rotation of the valve stem in either direction, while the device remains locked.

The advantages of my improved locking means will be apparent. It will be possible to place this locking means upon valves now ordinarily in use and prevent tampering with the same by unauthorized parties without the necessity of constant watching. The locking device may be applied to valves under widely varying conditions and may be modified in various ways without departing from the spirit of my invention.

What I claim as new and desire to protect by Letters Patent is:

1. A locking means for gate valves comprising a pair of clamping jaws, means to secure the same firmly about the stem of the valve, clamping plates, fixed below said jaws, means to lock said clamping jaws to said plate, and prevent the further operation of said securing means.

2. A locking means for gate valves comprising a pair of clamping jaws, toothed recesses in the adjacent faces thereof adapted to fit about a valve stem, bolts securing said jaws adjustably against the valve stem, nuts on said bolts, a hasp hinged to one of said jaws, and adapted to cover said nuts, and means including a padlock to secure said hasp in operative position.

3. A locking means for gate valves comprising a pair of clamping jaws, threaded bolts securing said jaws in position, nuts on said bolts, a depending hasp hinged to one of said jaws, a clamping plate fixed adjacent said jaws, a laterally projecting staple thereon, said staple so positioned as to co-operate with said hasp, and a locking device securing said hasp to said staple.

4. A locking means for valves comprising a valve stem, a yoke through which the said valve stem operates, clamping jaws above said yoke, means below said yoke to secure said clamping jaws firmly on said valve stem, and means co-operating with said jaws to prevent the operation of said valve stem.

5. In gate valves having a housing, a cylindrical valve stem and means thereon to manipulate the same, a locking means comprising a pair of toothed jaws, means to clamp same against said valve stem, means to protect said clamping means and means to lock said protecting means to the housing in the manner described.

In testimony whereof, I hereunto affix my signature, this the 17 day of August, A. D., 1920.

SAMUEL F. BASHARA.